(12) United States Patent
Grosch et al.

(10) Patent No.: US 10,365,618 B2
(45) Date of Patent: Jul. 30, 2019

(54) METHOD FOR OPERATING A REDUNDANT AUTOMATION SYSTEM

(71) Applicants: Thomas Grosch, Roßtal (DE); Juergen Laforsch, Bühl (DE); Albert Renschler, Ettlingen (DE)

(72) Inventors: Thomas Grosch, Roßtal (DE); Juergen Laforsch, Bühl (DE); Albert Renschler, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 1076 days.

(21) Appl. No.: 13/972,576

(22) Filed: Aug. 21, 2013

(65) Prior Publication Data

US 2014/0058533 A1    Feb. 27, 2014

(30) Foreign Application Priority Data

Aug. 24, 2012  (EP) .................................... 12181713

(51) Int. Cl.
| | |
|---|---|
| *G06F 9/54* | (2006.01) |
| *G05B 15/02* | (2006.01) |
| *G06F 11/16* | (2006.01) |
| *G06F 11/20* | (2006.01) |

(52) U.S. Cl.
CPC ............. *G05B 15/02* (2013.01); *G06F 9/546* (2013.01); *G06F 11/1687* (2013.01); *G06F 11/2033* (2013.01); *G06F 11/2038* (2013.01); *G06F 11/2097* (2013.01)

(58) Field of Classification Search
None
See application file for complete search history.

(56) References Cited

U.S. PATENT DOCUMENTS

| | | | | |
|---|---|---|---|---|
| 5,157,663 A | * | 10/1992 | Major | G06F 11/1482 714/10 |
| 5,398,331 A | * | 3/1995 | Huang | G06F 11/1633 714/12 |
| 5,551,034 A | | 8/1996 | Herz | |
| 5,764,903 A | * | 6/1998 | Yu | G06F 11/2071 709/208 |
| 8,301,700 B1 | * | 10/2012 | Havemose | G06F 11/203 370/254 |
| 2003/0126347 A1 | * | 7/2003 | Tan | G06F 3/0607 710/313 |
| 2005/0021567 A1 | * | 1/2005 | Holenstein | G06Q 10/087 |
| 2005/0021751 A1 | | 1/2005 | Block et al. | |

FOREIGN PATENT DOCUMENTS

| | | |
|---|---|---|
| EP | 1 291 744 | 3/2003 |
| FR | 2 700 401 | 7/1994 |
| WO | WO 2012/003862 | 1/2012 |

* cited by examiner

*Primary Examiner* — Shih-Wei Kraft
(74) *Attorney, Agent, or Firm* — Cozen O'Connor

(57) ABSTRACT

A method with which one subsystem of a redundant automation system that is provided with a first subsystem and a second subsystem is operated as a master and another subsystem is operated as a slave, where the subsystems are provided with transmission and reception tasks to transmit and receive messages, and where messages are also interchanged with program path synchronization during a temporally asynchronous run through a program path in the master and the slave.

2 Claims, 2 Drawing Sheets

METHOD FOR OPERATING A REDUNDANT AUTOMATION SYSTEM

BACKGROUND OF THE INVENTION

1. Field of the Invention

The invention relates to a method for operating a redundant automation system provided with a first subsystem and a second subsystem, where one of the subsystems is operated as a master and the other subsystem is operated as a slave, and where the subsystems are provided with transmission and reception tasks to transmit and receive messages. In addition, the invention relates to a redundant automation system that is suitable for implementing the method.

2. Description of the Related Art

In general, methods having inter-task communication mechanisms and redundant automation system for implementing this method are known per se in automation technology. In the environment of this automation technology, there is an increasing demand for highly available solutions (H systems) that are suitable for minimizing possible downtimes of the installation. The development of such highly available solutions is very cost-intensive, where an H system usually used in the automation environment is distinguished by the fact that two or more subsystems in the form of automation devices or computer systems are coupled to one another via a synchronization connection. In principle, both subsystems can have read and/or write access to the peripheral units connected to this H system. One of the two subsystems leads with respect to the peripherals connected to the system. Consequently, outputs to peripheral units or output information for these peripheral units is/are effected only by one of the two subsystems that operates as a master or has assumed the master function. So that both subsystems can run in a synchronous manner, the subsystems are synchronized at regular intervals via the synchronization connection. With respect to the frequency and extent of synchronization, different forms may be distinguished (i.e., warm standby, hot standby).

An H system often requires a smooth "failover", if one of the subsystems fails and it is necessary to change over to the other subsystem. This means that, despite this unplanned changeover or this unplanned change from one subsystem to the other, this changeover or change does not have a disruptive effect on the technical process to be controlled. Here, it is permissible for a (short) dead time to occur at the outputs of the connected peripherals, during which the outputs remain at their last valid process output values. However, a jump (surge) in the values at these outputs on account of the changeover is undesirable and should therefore be avoided. Consequently, "smooth" should also be understood as meaning the continuity of the curve shape of the process output values.

In order to achieve this, the two subsystems must have the same system state at the time of the failure. This is ensured by a suitable synchronization method. If both subsystems are processing the input information (inputs) of the process, both systems are in the same system state when they change their respective "thread global" data (shared data of programs, in particular programs with different priorities) in the same manner given the same process input data or process input information. In order to achieve this, the synchronization method ensures that the individual threads of the two subsystems are interrupted or executed in the same manner. This results in an identical "thread mountain".

Prior European patent application 12166006.2, the entire disclosure content of which is intended to be part of the present application, proposes a method for operating a redundant automation system provided with a first subsystem and a second subsystem, which method is used to dispense with temporally synchronous communication between the subsystems with regard to synchronizing the program processing on the two subsystems. One of these subsystems in the form of a master does not (actively) wait for a response from the other subsystem in the form of a slave in order to continue its program processing. That is, relevant information is transmitted from the master to the slave in a temporally asynchronous manner. As a result, the processing performance of the master is decoupled from the communication bandwidth available for event synchronization, which is particularly important with regard to the increasing imbalance between the increase in the processing performance of the processors, on the one hand, and the increase in the communication performance, on the other hand. This is because the communication performance usually cannot keep up with the increasing processing performance.

After an event has occurred, the two subsystems are synchronized such that both the master and the slave run through the same program paths (path synchronization) on account of this event, where the runs are effected in a temporally asynchronous manner. This means that the master temporally leads the slave or the slave temporally trails the master with regard to the program processing. In this context, "trailing" or "leading" is understood as meaning the time difference between the beginning of the processing of the processing sections by the master and the beginning of the processing of the processing sections by the slave, which corresponds to the time at which the release signal occurs.

On account of this leading and trailing, measures are required to send and receive messages in a suitable manner using transmission and reception tasks with respect to processing with program path synchronization. For example, if a communication task of the respective subsystem transmits messages to the reception task of the respective subsystem, it must be ensured that the transmission and reception sequence in the slave corresponds to that in the master.

If—as known per se—messages were processed in the slave in a similar manner to that in the master, a different processing sequence of the messages might result in the master and in the slave on account of the temporally asynchronous run through the program paths, thus possibly resulting in disruption to a technical process with regard to proper control.

SUMMARY OF THE INVENTION

It is therefore an object of the invention to provide a method and redundant automation system that avoids the above-described disadvantages.

This and other objects and advantages are achieved in accordance with the invention by the method and automation system in which messages are also advantageously interchanged with program path synchronization within the scope of a temporally asynchronous run through a program path in the master and in the slave.

It should understood that the method may also be used in an automation system which processes the program paths in a temporally synchronous manner.

In an embodiment, second messages are transmittable both to a reception task of the master and to a reception task of the slave using a transmission task of the master or of the slave.

If the master reads in, for example, process input values that are received by the master as a telegram from a peripheral unit, a transmission task of the master must provide both its own reception task and a reception task of the slave with these process input values by means of a message for further processing. This means that, in this case, the transmission task runs only in the master, but the reception task runs both in the master and in the slave. If the slave reads in the process input values, the transmission task of the slave must transmit this message representing the process input values to the respective reception tasks of the master and of the slave. In both cases, one transmission task (either in the master or in the slave) and two reception tasks (one in each of the master and the slave) are active. The process input information is processed in the same sequence both in the master and in the slave in a temporally asynchronous manner and with program path synchronization, thus enabling disruption-free redundant operation of the automation system.

If a third transmission task of one of the subsystems is to be used to transmit a third message to a third reception task of this subsystem, one embodiment of the invention provides for the message handler of this subsystem to be used to transmit the third message to the reception task of this subsystem. This message is passed through from one level to the next in a layer stack of the master or of the slave, for example.

If a fourth transmission task of each subsystem is to be used to transmit a fourth message only to a fourth reception task of one of the subsystems, another embodiment of the invention provides for this message to be forwarded to the reception task of the respective subsystem by the message handler of the respective subsystem only if this message handler detects that this subsystem is the recipient of this message. For example, the situation may occur in which an operating and monitoring device is connected only to the master and a telegram needs to be transmitted to this operating and monitoring device. The message handler of the master detects that the operating and monitoring device is connected to the master and therefore forwards the message representing the telegram to the reception task of the master. A control program of the master, for example, uses this received message to generate a telegram that is transmitted by the master to the operating and monitoring device. In contrast, the message handler of the slave detects that no operating and monitoring device is connected to the slave and therefore rejects the message, which means that this message is not forwarded to the reception task of the slave.

It should be noted that a transmission task or reception task is also understood as meaning a transmission thread or reception thread or another suitable transmission module or reception module or suitable program code for implementing communication within a subsystem or between the subsystems. It should also be noted that a first, a second, a third and a fourth message should only be understood as meaning different messages. The first, second and third messages are not understood as meaning any temporal sequence with respect to transmission and reception of these messages. Third messages may be transmitted or received before first or second messages, for example.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail below using an exemplary embodiment and with reference to the single FIGURE of the drawing, in which.

DETAILED DESCRIPTION OF THE PREFERRED EMBODIMENTS

Figure 1:
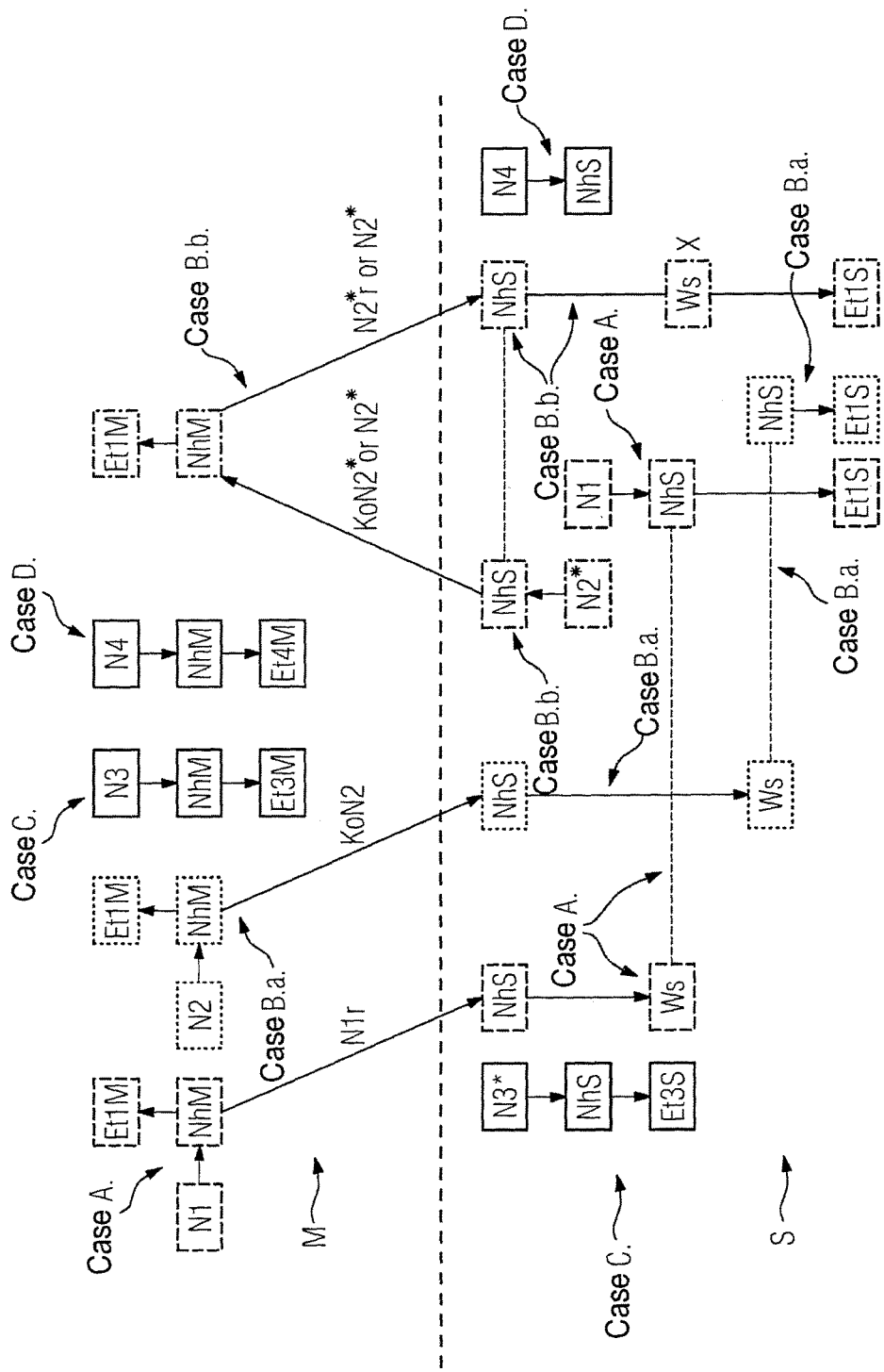
FIG. 1 shows a simplified illustration of sequences of information interchange between the transmission and reception tasks of a redundant automation system.

With respect to FIG. 1 for the sake of simplicity, the following designations or formulations are provided below for cases A. to D.:

A. A transmission task and a reception task are referred to as two-channel if a message should be or is transmitted both from a transmission task of the master to a reception task of the master and from a transmission task of the slave, corresponding to the master transmission task, to a reception task of the slave, corresponding to the master reception task. In other words, a two-channel transmission task and a two-channel reception task run on both subsystems with path synchronization.

B. If a message should be or is transmitted both to a reception task of the master and to a reception task of the slave, corresponding to this reception task, using a transmission task of the master or of the slave, the transmission task is referred to as a single-channel transmission task and the reception task is referred to as a two-channel reception task. In this case, a distinction needs to be made between whether the message is transmitted to the reception task of the master and of the slave using (a) a transmission task of the master or (b) using a transmission task of the slave.

C. If the transmission task of one of the subsystems should be or is used to transmit the message to the reception task of this subsystem, the transmission task is referred to as a single-channel transmission task and the reception task is referred to as a single-channel reception task.

D. A transmission task is called a two-channel transmission task and a reception task is called a single-channel reception task if a message should be or is transmitted only to a reception task of one of the subscribers using the corresponding transmission task of each subscriber.

In addition, it is assumed below that both a master and a slave or a reserve of the redundant automation system each process a control program for controlling a technical process, where the processing is performed with program path synchronization, but the runs through these program paths are performed in a temporally asynchronous manner. In connection with such processing, reference is made to prior European patent application 12166006.2.

Transmission of a first message N1, which is transmitted from a two-channel transmission task to a two-channel reception task (case A.), and transmission of a second message N2, which is transmitted from a single-channel transmission task to a two-channel reception task (case B.), are initially discussed in more detail.

This first message N1, which is to be processed both by a master M and by a slave S, is transmitted by a first transmission task of the master M to a message handler NhM of this master M and by a first transmission task of the slave S to a message handler NhS of this slave S. The message handler NhM of the master M forwards this message N1 to a first reception task Et1M via a master system core or a master operating system and also transmits, to the message handler NhS of the slave S, a message reference N1r which indicates to the slave S that the master M has transmitted this message N1 to its reception task Et1M. In contrast, this message handler NhS of the slave S does not initially forward the message N1 to a first reception task Et1S of the slave S via a slave system core or a slave operating system but, rather, stores the message reference N1r in a queue Ws of the slave S. This is because, on account of the temporal trailing of the slave S, this first message N1 can be forwarded to the slave reception task Et1S only when the two-channel tasks of the slave S have reached the same processing progress as the two-channel tasks of the master M at the time at which the message N1 has been forwarded to the reception task Et1M in the master M. This queue Ws may store both message references and, as also shown below, messages, the temporal storage sequence representing the message transmission sequence or the transmission sequence of messages transmitted using the master M.

It is assumed that a second message N2 following the first message N1 is to be transmitted from a single-channel transmission task to the two-channel reception task Et1M, Et1S (case B.), but the first message N1 has not yet been transmitted to the first slave reception task Et1S by the message handler NhS of the slave S on account of the trailing of the slave.

The situation in which this second message N2 is transmitted by a second transmission task of the master M (case B.a.) is initially considered. The message handler NhM of the master M forwards the second message N2 to the first reception task Et1M and transmits a copy KoN2 of this message N2 to the message handler NhS of the slave S, which message handler stores this copy KoN2 in the queue Ws.

The queue Ws therefore stores the message reference N1r and the copy KoN2 of the second message N2 in accordance with the master transmission sequence, where the slave S processes the content of the queue Ws according to the temporal storage sequence to ensure processing with program path synchronization in the master M and slave S of the redundant automation device.

On account of the fact that the message reference N1r of the first message N1 was stored in the queue Ws before the copy KoN2 of the second message N2, this message reference N1r is read out using the message handler NhS of the slave S before the copy KoN2 of the second message N2. As a result, this message handler NhS transmits the first message N1 associated with this message reference N1r to the first reception task Et1S of the slave S.

After the message reference N1r has been read from the queue Ws and processed by the message handler NhS of the slave S, this message handler NhS, if the slave S has reached the same processing progress, reads the copy of the second message KoN2 from the queue Ws in a subsequent step and forwards the copy to its first reception task Et1S.

The transmission or forwarding of the first and second messages N1, N2 to the reception task Et1S of the slave S, which corresponds to the first reception task Et1M of the master M, has been concluded, where the forwarding sequence corresponds to that in the master M.

If no message references or message copies were stored in the queue Ws, the message handler NhS of the slave S would be used to directly forward a message copy, transmitted from the master M to the slave S, to a slave reception task, and the message copy would then therefore not be stored in the queue Ws.

Instead of (or in addition to) the message transmission described according to case B.a., the situation may occur in which a second message N2* of a single-channel transmission task of the slave S, following the first message N1, is transmitted to a two-channel reception task Et1M, Et1S (case B.b.), but the first message N1 has not yet been transmitted to the first slave reception task Et1S by the message handler NhS of the slave S on account of the trailing of the slave.

Here, a transmission task of the slave S transmits the second message N2* to the message handler NhS which, because the master M temporally leads the slave S, does not directly supply this message N2* to its reception task Et1S but rather stores it and transmits the copy KoN2* of the message N2* to the message handler NhM of the master M. This message handler NhM forwards the copy KoN2* of the message N2* to its reception task Et1M and additionally transmits a further message reference N2*r to the message handler NhS of the slave S. If the queue Ws is empty, which is the case in the present example because the message handler NhS of the slave S has already transmitted the first message N1 (or the message N1 and additionally the second message N2 according to case B.a.) to the first slave reception task Et1S in the meantime, the message handler NhS of the slave S directly supplies the second message N2* associated with the message reference N2r to its first reception task Et1S. Otherwise (queue "not empty"), the message handler NhS stores the second message N2* in the queue Ws (indicated by an "X" in the figure). In the last-mentioned case, the second message N2* would be transmitted to the reception task Et1S only after the message handler NhS has processed the messages and message references stored before this message N2* and finally reads the message N2* from the queue Ws.

Instead of storing the second message N2* in the slave S and transmitting a copy KoN2* to the master M, the message handler NhS of the slave S can be configured in such that it does not store the second message N2* but, rather, directly supplies it to the message handler NhM of the master M, where the message handler NhM is designed in this case such that it forwards this message N2* to the first reception task Et1M of the master M and then transmits or "plays back" this message N2* to the message handler NhS of the slave S again. In the manner described, the message handler NhS transmits this message N2* to the first slave reception task Et1S if the queue Ws is empty which, as explained, is the case in the present example. Otherwise (queue "not empty"), as described the message handler NhS initially stores the message N2* in the queue Ws. The message N2* would again be transmitted to the reception task Et1S only after the message handler NhS has processed the messages and message references stored before this message N2* and finally reads the message N2* from the queue Ws.

Case C. is considered below. In that case, the transmission task of one of the subsystems is used to transmit a third message to the reception task of this subsystem (single-channel transmission task and single-channel reception task. Here, single-channel tasks do not run with path synchronization). The respective message handler NhM, NhS transmits such a third message N3 or N3* of a transmission task of the master M or of the slave S to a third reception task Et3M, Et3S of the master M and of the slave S.

It is assumed below that an operating and monitoring device is connected only to the master M. The message handler NhM of the master M detects that this operating and monitoring device is connected to the master M and transmits a fourth message N4 of the master transmission task, representing an operating and monitoring telegram, to a fourth reception task Et4M of the master M (case D.). In contrast, the message handler NhS of the slave S detects that the operating and monitoring device is not connected to the slave S and, therefore, rejects the fourth message N4 of a slave transmission task, which means that this message N4 is not forwarded to a fourth reception task of the slave S.

Figure 2:
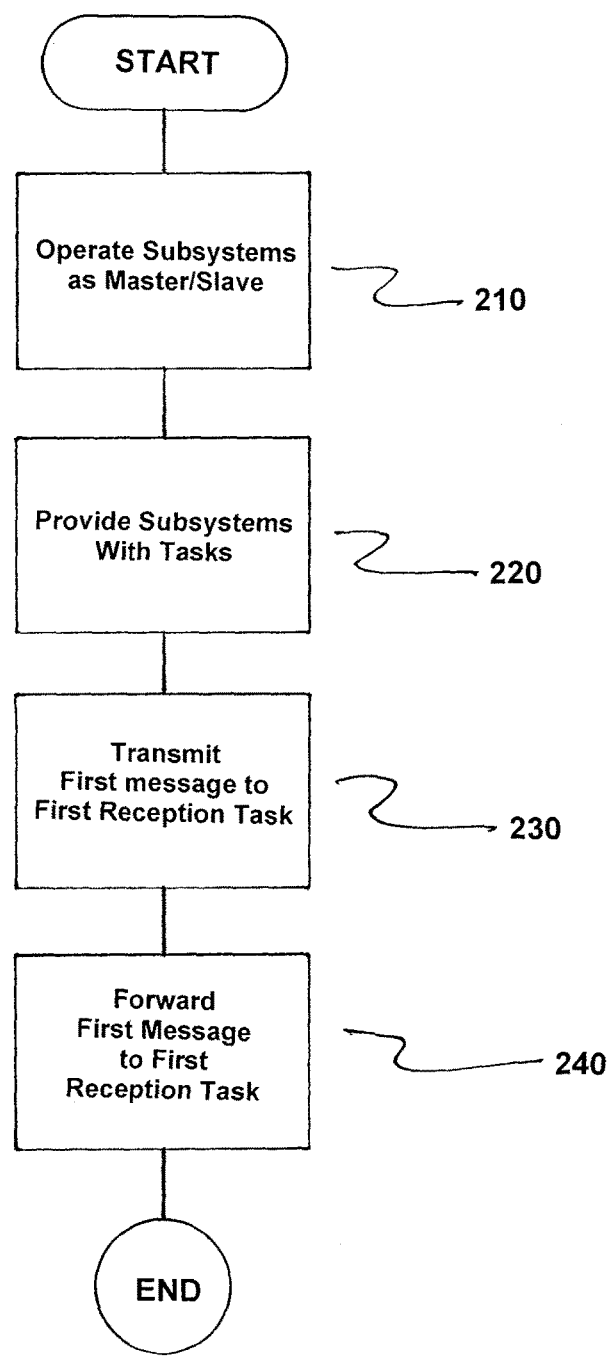
FIG. 2 is a flowchart of the method in accordance with the invention.

FIG. 2 is a flow chart of a method for operating a redundant automation system provided with a first subsystem and a second subsystem. The method comprises operating one of the first and second subsystems as a master (M) and operating another of the first and second subsystems as a slave (S), as indicated in step 210. Next, the first and second subsystems (M, S) are provided with transmission and reception tasks to transmit and receive messages, as indicated in step 220.

A first message (N1) is transmitted both from a first transmission task of the master (M) to a first reception task (Et1M) of the master (M) and from a first transmission task of the slave (S) to a first reception task (Et1S) of the slave (S) by forwarding the first message (N1) to the reception task (Et1M) of the master (M) using a message handler (NhM) of the master (M), as indicated in step 230. Here, the message handler (NhM) of the master is used to transmit a message reference (N1r) to a message handler (NhS) of the slave (S) for entry in a queue (Ws) of the slave (S), and the queue (Ws) indicates the transmission sequence of messages transmitted using the master (M).

The first message (N1) is now forwarded to the first reception task (Et1S) of the slave (S) using the message handler (NhS) of the slave after the message reference (N1r) has been read from the queue (Ws) of the slave using the message handler (NhS) of the slave (S), as indicated in step 240.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating a redundant automation system provided with a first subsystem and a second subsystem which each include a processor for executing transmission and reception tasks to provide disruption free redundant operation of the automation system, comprising:

operating one of the first and second subsystems as a master and operating another of the first and second subsystems as a slave;

providing the first and second subsystems with transmission and reception tasks to transmit and receive messages;

forwarding a first message to the master using a message handler of the master such that the first message is transmitted both from a first transmission task of the master to a first reception task of the master and from a first transmission task of the slave to a first reception task of the slave, the message handler of the master being utilized to transmit a message reference to a message handler of the slave for entry in a queue of the slave, and the queue indicating a transmission sequence of messages transmitted utilizing the master;

forwarding the first message to the first reception task of the slave using the message handler of the slave after the message reference has been read from the queue of the slave utilizing the message handler of the slave to ensure processing of the messages in the master and the slave of the redundant automation system in a temporally asynchronous manner and with program path synchronization to provide disruption free operation of the redundant automation system;

wherein one of:

(i) a second message is transmitted both to the first reception task of the master and to the first reception task of the slave utilizing a second transmission task of the master by supplying the second message to the reception task of the master using the message handler of the master and a copy of the second message being transmitted to the message handler of the slave, the message copy being forwarded to the reception task of the slave utilizing the message handler of the slave when the queue does not store any message references or messages, and the copy of the second message otherwise initially being entered in the queue for forwarding to the reception task of the slave; and (ii) the second message is transmitted both to the first reception task of the slave and to the first reception task of the master utilizing a second transmission task of the slave by one of:

(a) storing the second message using the message handler of the slave and transmitting a copy of the second message to the message handler of the master for forwarding to the reception task of the master, the message handler of the master transmitting a further message reference to the message handler of the slave, the stored message being transmitted to the reception task of the slave utilizing the message handler of the slave when the queue does not store any message references or messages, and otherwise the further message reference initially being stored in the queue, the copy of the second message being transmitted to the reception task of the slave after the further message reference has been read from the queue; and (b) transmitting the second message to the message handler of the master utilizing the message handler of the slave for forwarding to the reception task of the master, the message handler of the master transmitting the second message to the message handler of the slave, the second message being transmitted to the reception task of the slave using the message handler of the slave when the queue does not store any message references or messages, and otherwise the second message being entered in the queue for forwarding to the reception task of the slave; and wherein a third transmission task of one of the first and second subsystems is used to transmit a third message to a third reception task of one of the first and second subsystems by using a message handler of one of the first and second subsystems to transmit the third message to the third reception task of one of the first and second subsystems.

2. A redundant automation system, comprising:

a first subsystem operated as a master; and a second subsystem operated as a slave, the first and second subsystems including a processor for executing transmission tasks and reception tasks to transmit and receive messages;

wherein the automation system is configured to forward a first message via a message handler to the master and transmit a message reference to a message handler of the slave for entry in a queue of the slave such that the first message is transmitted both from a first transmission task of the master to a first reception task of the master and from a first transmission task of the slave to a first reception task of the slave;

wherein the message handler of the slave forwards the first message to the reception task of the slave after the message reference has been read from the queue to ensure processing of the messages in the master and the slave of the redundant automation system in a temporally asynchronous manner and with program path synchronization in a disruption-free manner;

wherein the automation system is configured to one of:

(i) transmit a second message both to the first reception task of the master and to the first reception task of the slave utilizing a second transmission task of the master by the message handler of the master supplying the second message to the reception task of the master and transmitting a copy of the second message to the message handler of the slave, which forwards the copy of the second message to the reception task of the slave when the queue does not store any message references or messages, and otherwise enters the copy of the second message in the queue of the slave for forwarding to the reception task of the slave; and (ii) transmit the second message both to the first reception task of the slave and to the first reception task of the master utilizing a second transmission task of the slave by one of:

(a) storing, by the message handler of the slave, the second message and transmitting a copy of the second message to the message handler of the master for forwarding to the reception task of the master, the message handler of the master transmitting a further message reference to the message handler of the slave, the message handler of the slave forwarding the stored message to the reception task of the slave when the queue does not store any message references or messages, and otherwise the further message reference initially being stored in the queue, the copy of the second message being transmitted to the reception task of the slave after the further message reference has been read from the queue; and (b) transmitting, by the message handler of the slave, the second message to the message handler of the master for forwarding to the reception task of the master, the message handler of the master transmitting the second message to the message handler of the slave, the message handler of the slave forwarding the second message to the reception task of the slave when the queue does not store any message references or messages, and otherwise entering the second message in the queue for forwarding to the reception task of the slave; and wherein a third transmission task of one of the first and second subsystems is used to transmit a third message to a third reception task of one of the first and second subsystems by using a message handler of one of the first and second subsystems to transmit the third message to the third reception task of one of the first and second subsystems.

* * * * *